(12) United States Patent
Chang

(10) Patent No.: US 8,029,600 B2
(45) Date of Patent: *Oct. 4, 2011

(54) SORBENT FILTER FOR THE REMOVAL OF VAPOR PHASE CONTAMINANTS

(75) Inventor: Ramsay Chang, Mountain View, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 11/592,606

(22) Filed: Nov. 3, 2006

(65) Prior Publication Data

US 2008/0105121 A1    May 8, 2008

(51) Int. Cl.
 *B03C 3/00* (2006.01)
 *B01D 53/02* (2006.01)
(52) U.S. Cl. .......... 95/70; 95/107; 95/109; 95/110; 95/134; 96/55; 96/123; 96/135; 96/150
(58) Field of Classification Search ............ 95/70, 92, 95/93, 94, 134, 214, 107, 108, 109, 110; 96/55, 134, 135, 355, 361, 362, 363, 364, 96/123, 150

See application file for complete search history.

(56) References Cited

U.S. PATENT DOCUMENTS

| | | |
|---|---|---|
| 2,067,303 A | 1/1937 | Tennison |
| 2,486,877 A | 11/1949 | Ransburg et al. |
| 2,593,377 A | 4/1952 | Wintermute |
| 3,404,513 A | 10/1968 | Roberts |
| 3,768,258 A | 10/1973 | Smith et al. |
| 3,932,151 A | 1/1976 | Lau |
| 4,049,399 A | 9/1977 | Teller |
| 4,193,774 A | 3/1980 | Pilat |
| 4,255,166 A | 3/1981 | Gernand et al. |
| 4,455,281 A | 6/1984 | Ishida et al. |
| 4,544,542 A | 10/1985 | Angevine et al. |
| 4,613,487 A | 9/1986 | Yoon et al. |
| 4,969,934 A | 11/1990 | Kusik et al. |

(Continued)

FOREIGN PATENT DOCUMENTS

CA        2082690        6/1993

(Continued)

OTHER PUBLICATIONS

U.S. Appl. No. 12/411,255, filed Mar. 25, 2009, Chang.

*Primary Examiner* — Duane Smith
*Assistant Examiner* — Karla Hawkins
(74) *Attorney, Agent, or Firm* — Owens Tarabichi LLP

(57) ABSTRACT

Methods and apparatuses are described for removing a contaminant, such as a vaporous trace metal contaminant like mercury, from a gas stream. In one embodiment, a primary particulate collection device that removes particulate matter is used. In this embodiment, a sorbent filter is placed within the housing of the primary particulate collection device, such as an electrostatic precipitator or a baghouse, to adsorb the contaminant of interest. In another embodiment, a sorbent filter is placed within a scrubber, such as a wet scrubber, to adsorb the contaminant of interest. In some embodiments, the invention provides methods and apparatuses that can advantageously be retrofit into existing particulate collection equipment. In some embodiments, the invention provides methods and apparatuses that in addition to removal of a contaminant additionally remove particulate matter from a gas stream.

44 Claims, 7 Drawing Sheets

U.S. PATENT DOCUMENTS

| | | | |
|---|---|---|---|
| 5,024,681 | A | 6/1991 | Chang |
| 5,158,580 | A | 10/1992 | Chang |
| 5,217,511 | A | 6/1993 | Plaks et al. |
| 5,250,267 | A | 10/1993 | Johnson et al. |
| 5,336,299 | A | 8/1994 | Savell |
| 5,409,522 | A * | 4/1995 | Durham et al. .................. 75/670 |
| 5,476,538 | A | 12/1995 | Nishio et al. |
| 5,505,766 | A | 4/1996 | Chang |
| 5,827,352 | A | 10/1998 | Altman et al. |
| 5,854,173 | A | 12/1998 | Chang et al. |
| 5,879,432 | A | 3/1999 | Morlec et al. |
| 5,948,143 | A | 9/1999 | Sjostrom et al. |
| 6,136,072 | A | 10/2000 | Sjostrom et al. |
| 6,185,934 | B1 | 2/2001 | Teboul |
| 6,451,094 | B1 | 9/2002 | Chang et al. |
| 6,468,489 | B1 | 10/2002 | Chang et al. |
| 6,514,315 | B1 | 2/2003 | Chang |
| 6,558,454 | B1 | 5/2003 | Chang et al. |
| 6,695,894 | B2 | 2/2004 | Chang et al. |
| 6,712,878 | B2 | 3/2004 | Chang et al. |
| 6,818,043 | B1 | 11/2004 | Chang et al. |
| 6,878,192 | B2 | 4/2005 | Pasic |
| 6,895,875 | B1 | 5/2005 | Lissianski et al. |
| 6,905,534 | B2 | 6/2005 | Chang et al. |
| 6,953,494 | B2 | 10/2005 | Nelson |
| 6,958,088 | B1 | 10/2005 | Moriyama |
| 6,981,456 | B2 | 1/2006 | Lissianski et al. |
| 7,048,779 | B1 | 5/2006 | Weyand et al. |
| 7,141,091 | B2 * | 11/2006 | Chang ............... 95/58 |
| 7,306,774 | B2 | 12/2007 | DeBerry |
| 7,600,479 | B2 | 10/2009 | Lissianski et al. |
| 2004/0045437 | A1 * | 3/2004 | Chang et al. .................. 95/134 |
| 2004/0118285 | A1 | 6/2004 | Kim et al. |
| 2004/0123622 | A1 * | 7/2004 | Yuzawa et al. ................. 62/475 |
| 2005/0132880 | A1 * | 6/2005 | Chang ............... 95/63 |
| 2005/0135981 | A1 | 6/2005 | Chang |
| 2006/0021554 | A1 | 2/2006 | Lissianski et al. |
| 2006/0029533 | A1 | 2/2006 | DeBerry |
| 2006/0162564 | A1 | 7/2006 | Paterson et al. |
| 2006/0186054 | A1 | 8/2006 | Webb et al. |
| 2008/0105120 | A1 | 5/2008 | Berry et al. |
| 2008/0105121 | A1 | 5/2008 | Chang |
| 2008/0115704 | A1 | 5/2008 | Berry |

FOREIGN PATENT DOCUMENTS

| | | | |
|---|---|---|---|
| JP | 53-140675 | A | 12/1978 |

* cited by examiner

SORBENT FILTER FOR THE REMOVAL OF VAPOR PHASE CONTAMINANTS

BACKGROUND

1. Background of the Invention

The invention relates generally to the removal of vapor phase contaminants from a gas stream. More specifically, the invention is directed to a method and apparatus for the removal of vapor phase contaminants, such as mercury, from the flue gas of a combustion system.

2. Description of Related Art

The emission of trace metals from utility power plants is an important. In particular, special attention has been given to trace contaminants, including, for example, mercury (Hg), in terms of their release into the environment and corresponding impacts on the environment. Generally, trace contaminants include those vaporous chemical species present in relatively low concentrations in a given gas stream as well as solid particulate matter. For example, mercury is present in flue gas from a fossil-fuel-fired combustion system in very low concentrations (<1 ppb) and forms a number of volatile compounds that are difficult to remove. Specially designed and costly emissions-control systems are required to effectively capture these trace amounts of mercury.

Several approaches have previously been adopted for removing mercury from gas streams. These techniques include passing the gas stream through a fixed or fluidized sorbent filter or structure or using a wet scrubbing system. Approaches using fixed bed technologies normally pass the mercury containing gas through a bed consisting of sorbent particles or through various structures such as honeycombs, screens, or fibers that are coated with a sorbent. Common sorbents include activated carbon and noble metals such as gold and silver. In many cases where noble metals are used, the structure is coated with the noble metal sorbent while the support underneath is made of ceramic or metallic materials. The sorbents in these fixed structures can be periodically regenerated by heating the structure and driving off the adsorbed mercury (see, for example, U.S. Pat. Nos. 5,409,522 and 5,419,884, which are incorporated by reference herein in their entireties). The mercury driven off can then be recovered or removed separately.

However, in regenerating the sorbent in such fixed bed systems, the bed must be taken off-line periodically. This necessitates that a second bed be used and remain on-line while the first one is regenerating. In addition, the beds need to be located downstream of a primary particulate collection device to remove all of the solid suspended particles in the gas stream and to avoid pluggage. These fixed bed systems also require significant space since they need to remove vapor phase contaminants, such as mercury, for long periods of time without having to be replaced or regenerated, and they are very difficult to retrofit into existing systems, such as into the ductwork of power plants, without major modifications and high pressure drop penalties (e.g., 10-30 inches of water).

U.S. Pat. Nos. 5,948,143 and 6,136,072, which are incorporated by reference herein in their entireties, describe concepts that addressed some of these problems through the use of porous tubes and plates that can be regenerated and cleaned while in the presence of flue gas containing particles. These porous tubes and plates are cleaned by a series of back pulses across their walls. However, the fabrication of porous tubes and plates is complex and relatively expensive. The tubes and plates are also heavy and difficult to install and heat due to the thick wall requirements.

Therefore, a need remains for a cost-effective method and apparatus for removing trace contaminants, in particular mercury, from gas streams, including, for example, the flue gas of a coal-fired combustion system. In addition, there is a need for an improved process and apparatus for removing such contaminants that can be easily retrofitted into an existing combustion system.

SUMMARY OF THE INVENTION

The invention provides methods and apparatuses for removing a contaminant from a gas stream, such as vaporous trace metal contaminants like mercury. In one embodiment, a primary particulate collection device that removes particulate matter is used. In this embodiment, a sorbent filter is placed within the housing of the primary particulate collection device, such as an electrostatic precipitator or a baghouse, to adsorb the contaminant of interest. In another embodiment, a sorbent filter is placed within a scrubber, such as a wet scrubber, to adsorb the contaminant of interest. In some embodiments, the invention provides methods and apparatuses that can advantageously be retrofit into existing particulate collection equipment. In some embodiments, the invention provides methods and apparatuses that in addition to removal of a contaminant additionally remove particulate matter from a gas stream.

In one embodiment, the invention provides a method for removing a vapor phase contaminant and particulate from a gas stream, comprising passing a gas stream comprising a vapor phase contaminant and particulate through a primary particulate collection device comprising a housing and at least one particulate collection section; removing at least a portion of the particulate from the gas stream using the at least one particulate collection section; passing the gas stream through a sorbent filter comprising a sorbent after the removing of said portion of said particulate, the sorbent filter positioned within the housing of the primary particulate collection device downstream of the at least one particulate collection section; and removing at least a portion of the vapor phase contaminant from the gas stream using the sorbent filter.

In another embodiment, the invention provides an apparatus for removing a vapor phase contaminant from a gas stream, comprising: (i) a particulate collection device comprising: a housing comprising an inlet port configured for connection to a gas duct and an outlet port configured for connection to a gas duct, and at least one particulate collection section; and (ii) a sorbent filter structure configured to hold a sorbent positioned within the housing of the particulate collection device downstream of the at least one particulate collection section, the sorbent filter structure comprising: an upstream porous surface, a downstream porous surface, and wherein the upstream and the downstream porous surfaces each extend in a direction substantially normal to a nominal direction of gas flow through the housing downstream and that define a gap between the upstream and the downstream porous surfaces to hold a sorbent there between.

Other embodiments and features of the invention are described in more detail below, including, for example, the use of multiple sorbent filters, various sorbents, methods for replacing the sorbent, the use of various particulate collection devices such as an electrostatic precipitator or a baghouse, and the use of the invention in a scrubber, such as a wet scrubber.

DETAILED DESCRIPTION OF THE INVENTION

Generally, the invention comprises methods and apparatuses for removing a contaminant from a gas stream, such as vaporous trace metal contaminants. In one embodiment, a primary particulate collection device that removes particulate matter is used. In this embodiment, a sorbent filter is placed within the housing of the primary particulate collection device, such as an electrostatic precipitator or a baghouse, to adsorb the contaminant of interest. In another embodiment, a sorbent filter is placed within a scrubber, such as a wet scrubber, to adsorb the contaminant of interest. In some embodiments, the invention provides methods and apparatuses that can advantageously be retrofit into existing particulate collection equipment. In some embodiments, the invention provides methods and apparatuses that in addition to removal of a vapor phase contaminant additionally remove particulate matter from a gas stream.

The following describes these and other exemplary embodiments of the present invention in conjunction with the accompanying drawings. The following descriptions are not intended to be limiting, and it should be appreciated that the drawings are not intended to be drawn to scale. It will be apparent to one of skill in the art that certain modifications may be made to the various exemplary embodiments as described. Such modifications are intended to be within the scope of the present invention.

Figure 1:
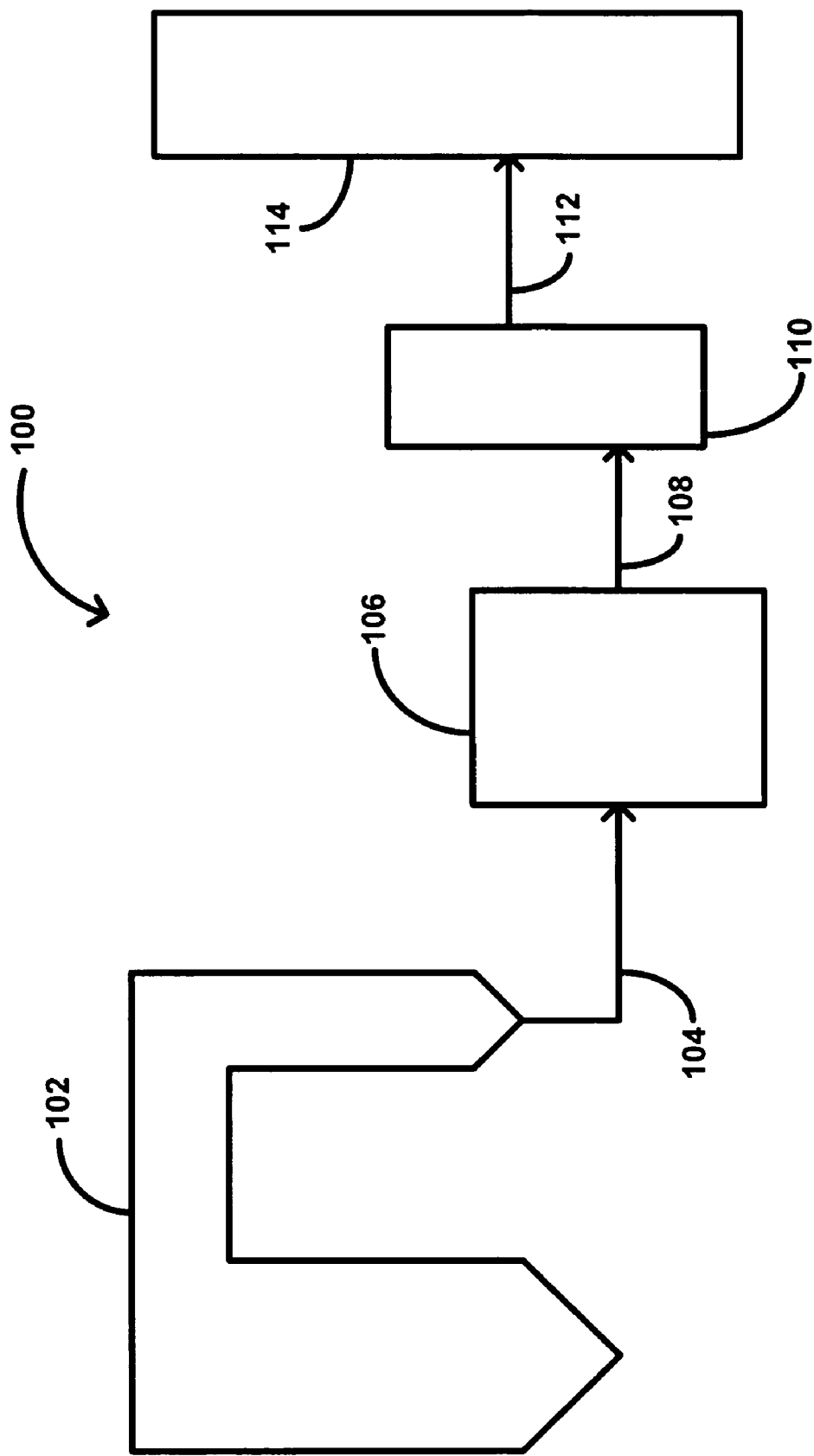
FIG. 1 illustrates one exemplary process in which the present invention may be utilized.

FIG. 1 illustrates one exemplary process in which the present invention may be utilized. The combustion process 100 comprises a combustion device 102, such as a fossil-fuel-fired boiler, that uses air to combust fuel, such as coal. The combustion device 102 produces a gas stream in the form of flue gas that exits the combustion device 102 through a combustion device outlet duct 104. The flue gas produced within the combustion device 102 is comprised of air and gaseous products of combustion, such as water vapor, carbon dioxide, oxides of nitrogen and sulfur, halides, organic compounds, mercury, selenium, and other trace metal vapors, and particulate matter. A particulate collection device 106 is connected to the combustion device outlet duct 104 and removes particulate matter from the flue gas. The flue gas then passes from the particulate collection device 106 through a particulate collection device outlet duct 108, either directly to a stack 114 where the flue gas is discharged to the atmosphere or optionally through a scrubber 110, such as a wet scrubber, a scrubber outlet duct 112, and then to the stack 114.

It should be appreciated that the particulate collection device may be referred to as a "primary" particulate collection device, which refers to a particulate collection device that removes the most fly ash from the gas stream downstream of the combustion device relative to any other device positioned downsteam of the combustion device in a given process. For example, construing the combustion device 102 in FIG. 1 as a coal-fired boiler, the particulate collection device 106 removes most of the particulate matter or fly ash generated by the coal-fired boiler and, therefore, may be referred to as a "primary" particulate collection device. Although, in the case where the scrubber 110 is also utilized, the particulate collection device 106 is most likely still a primary particulate collection device as it will remove more fly ash than the scrubber 110, even though the scrubber 110 may also remove some fly ash.

Figure 2:
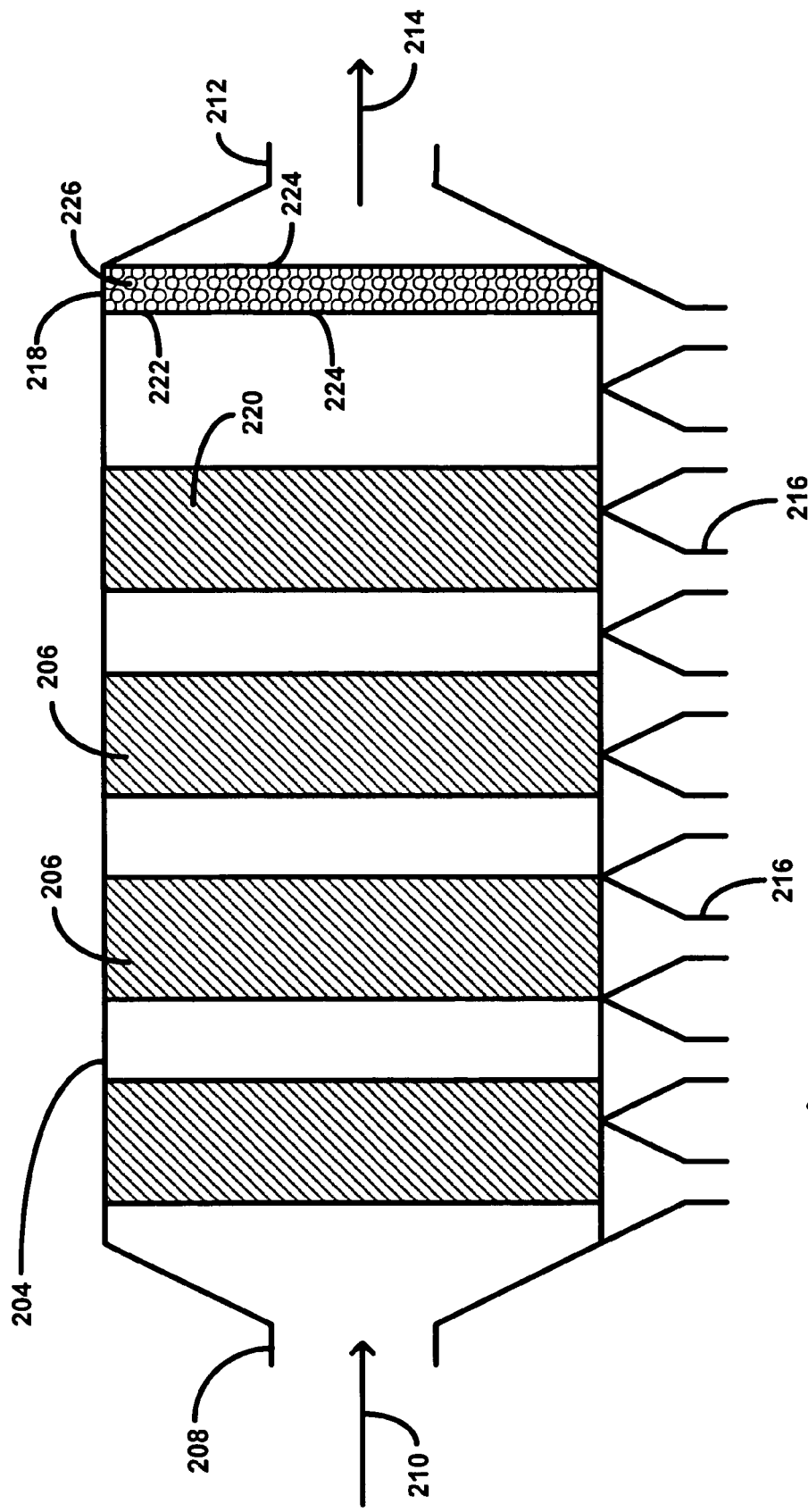
FIG. 2 is a cut-away view of an electrostatic precipitator illustrating an exemplary embodiment of the present invention.

FIG. 2 is a cut-away view of an electrostatic precipitator illustrating an exemplary embodiment of the present invention. In this embodiment, the electrostatic precipitator 202 comprises a housing 204 that has multiple particulate collection sections or regions within the housing 204 where particulate matter is collected. In this embodiment, each particulate collection section is an electrically charged collection plate 206 that serves to collect particulate matter such as fly ash. (The corresponding discharge electrodes are not shown.) The housing 204 comprises an inlet port 208 through which a gas stream enters the electrostatic precipitator 202 as indicated by the directional arrow 210. The housing also comprises an outlet port 212 through which the gas stream exists the electrostatic precipitator 202 as indicated by the directional arrow 214. The housing 204 is connected to a plurality of discharge ports 216 that are operated to discharge collected particulate matter from the collection plates 206 into hoppers (not shown). The collected particulate matter in the hoppers is then disposed.

A sorbent filter 218 is also positioned within the housing 204 of the electrostatic precipitator 202. In this embodiment, the sorbent filter 218 is positioned within the housing 204 downstream of the last collection plate 220, although it should be appreciated that the sorbent filter 218 may be positioned anywhere within the housing 204 and between any of the particulate collection sections or collection plates 206. The sorbent filter 218 comprises a structure 222 having side walls 224 that hold a sorbent material 226. The structure 222 can be attached at the top and bottom of the housing 204 or at each side wall of the housing 204 or at all of the foregoing. The structure 222 may also be configured such that it is capable of sliding into position along rails to facilitate easier insertion, removal, and replacement.

The side walls 224 of the structure 222 each comprise a porous surface, one located upstream of the other, that allows the gas stream to pass through the sorbent filter 218, thereby allowing the gas and the contaminant to contact the sorbent material 226. In this embodiment, the side walls 224 or porous surfaces are substantially flat and are positioned substantially normal to the nominal direction of gas flow through the electrostatic precipitator 202. The side walls 224 or porous surfaces extend from the top of the housing 204 to the bottom and from one side across to the other side. It should be appreciated that it is desirable to maximize the surface area of the porous surfaces to minimize the gas pressure drop across the sorbent filter 218 during operation; however, a portion of the structure 222 along the perimeter of the porous surfaces that is used to hold the porous surfaces in place may preclude the extension of the porous surfaces across the entire cross-sectional area of gas flow.

The porous surfaces each define a plurality of openings that allow the gas to pass through. The shape and size of these openings can be determined based on the particular application in conjunction with minimizing the gas pressure drop across the sorbent filter 218 during operation. The porous surfaces may be made from any material chemically and physically compatible with the operating conditions of the electrostatic precipitator and the gas composition. For example, where the gas composition is corrosive, the material used for the porous surfaces, as well as for the structure 222, must be able to sufficiently withstand such corrosivity. In one embodiment, the porous surfaces may be screens. In another embodiment, the porous surfaces may be a mesh material or a fibrous material. In another embodiment, the porous surfaces may be honeycombs. It should be appreciated that in some embodiments, the porous surfaces may be coated with a given sorbent, the composition of which is selected in a manner similar to the selection of the sorbent material 226 as described below.

The side walls 224 or porous surfaces of the sorbent filter 218 define a space between them in which the sorbent material 226 is held. The sorbent material 226 may be any material that acts as a sorbent to adsorb a given contaminant in the gas stream. In addition, the sorbent material 226 may also comprise a composition that not only adsorbs a contaminant but that chemically reacts with the contaminant as well. The choice of sorbent composition will be dependent upon the contaminant to be removed from the gas stream, including its physical properties and characteristics. For example, if vaporous mercury is the contaminant to be removed from the gas stream, the composition of the sorbent may be carbon or activated carbon. Other sorbent compositions useful in mercury removal are those that also react with the mercury, such as gold, which readily forms an amalgam with mercury, or silver or zinc, which also form amalgams. In another embodiment, the sorbent may be a noble metal. It should be appreciated that mixtures of sorbents having different compositions may also be used. The sorbent material may also comprise a sorbent that has a coating of sorbent material or may simply be an inert base material or substrate that is coated with a sorbent material.

The sorbent material 226 may be any shape and size that can be held by and between the side walls 222 or the porous surfaces of the sorbent filter 218. In one embodiment, the sorbent material may be granular or pelletized particles. In one embodiment, the granular or pelletized particles may be generally round in shape and have an average size of approximately 1 mm to approximately 5 cm in diameter.

In operation, the gas stream passes through the electrostatic precipitator 202. As the gas passes through the particulate collection sections, particulate in the gas stream is collected on the collection plates 206. The gas stream then passes through the sorbent filter 218 where a given contaminant is adsorbed onto the sorbent material 226. The gas stream then passes out of the electrostatic precipitator 202. It should also be appreciated that once the sorbent material 226 in the sorbent filter 218 is spent, the entire sorbent filter 218 can be removed and replaced with new or regenerated sorbent.

It should be appreciated that in a given process, the electrostatic precipitator 202, as configured in this embodiment, may serve as a primary particulate collection device such that a significant portion of the particulate matter is removed prior to the gas contacting or passing through the sorbent filter 218. In this configuration, there is less particulate matter in the gas stream that could act to plug the sorbent filter 218 or increase the gas pressure drop across the sorbent filter. Should the gas pressure drop across the sorbent filter 218 become excessive, the sorbent filter 218 can be removed and replaced.

It should also be appreciated that the sorbent filter 218 may also act to remove additional particulate matter that has not been removed in the upstream particulate collection sections of the electrostatic precipitator 202 or more generally an upstream particulate collection device or upstream primary particulate collection device. In one embodiment, approximately 10-90% of the particulate matter remaining in the gas stream after passing through the particulate collection sections of the electrostatic precipitator 202 may be removed by the sorbent filter 218. In another embodiment, approximately 10-50% of that remaining particulate matter may be removed by the sorbent filter 218. In yet another embodiment, approximately 10-20% of that remaining particulate matter may be removed by the sorbent filter 218.

It should also be appreciated that, generally, the placement of the sorbent filter within the housing of the electrostatic precipitator or other particulate collection device as described below is advantageous because of the relatively lower gas velocity within the housing of such particulate collection device. However, it should be appreciated that the sorbent filter does not necessarily need to be placed within the housing of a particulate collection device and may be placed simply downstream of a particulate collection device at a location where the gas velocity is lower than the average gas velocity between the particulate collection device and the outlet of the process.

Figure 3:
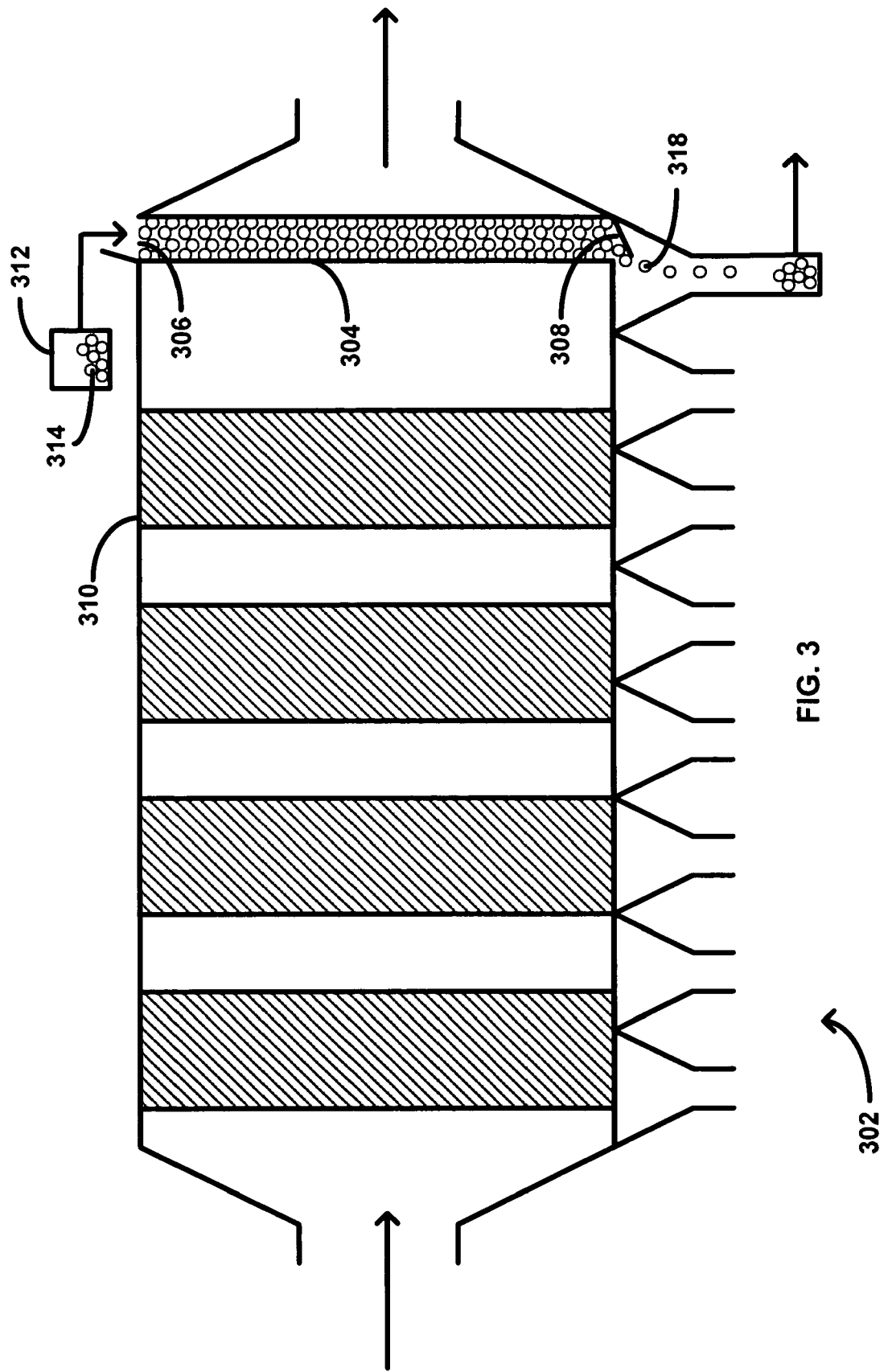
FIG. 3 is a cut-away view of an electrostatic precipitator illustrating another exemplary embodiment of the present invention.

FIG. 3 is a cut-away view of an electrostatic precipitator illustrating another exemplary embodiment of the present invention. In this embodiment, the electrostatic precipitator 302 is substantially similar to the electrostatic precipitator 202 shown in FIG. 2. It should also be appreciated that the material used for the sorbent filter side walls or porous surfaces and the sorbent material itself can be the same as that described in connection with FIG. 2. In this embodiment, however, the sorbent filter 304 is configured to be a moving bed or a semi-moving bed.

The sorbent filter 304 comprises ports 306, 308 located at the top and bottom of the electrostatic precipitator housing 310. A fresh sorbent feed container 312 is configured to contain fresh sorbent 314 (or sorbent that has been regenerated) to be fed to the sorbent filter 304 as desired. Each of ports 306, 308 are configured to open and close in conjunction with one another to allow fresh sorbent 314 to be fed through one port 306 of the sorbent filter 304 while spent sorbent 318 is discharged from the other port 308. The spent sorbent 318 may be collected and disposed or regenerated to produce fresh sorbent.

In operation, the opening and closing of the ports 306, 308 may be done using an electronic control system (not shown) or semi-manually where a decision is made as to when to open the ports 306, 308 based upon the need for the addition of fresh sorbent 314 and a process operator then either manually or via a control switch opens the ports 306, 308. It should be appreciated that the discharge of spent sorbent 318 and the addition of fresh sorbent 314 may be done batch-wise, in which case the entire sorbent in the sorbent filter 304 would be discharged, and the sorbent filter 304 would be recharged with all fresh sorbent 314. Alternatively, the discharge of spent sorbent 318 and the additional of fresh sorbent 314 may be done on a regular periodic basis depending upon the removal rate of the contaminant being removed, such as once a month, once a week, daily, hourly or more frequently, or at any other interval, such as every other day or every other hour. Alternatively still, the discharge of spent sorbent 318 and the addition of fresh sorbent 314 may be done continuously, thereby making the sorbent filter 304 a moving bed. It should be appreciated that in all cases, the addition of sorbent 314 may be done during operation of the electrostatic precipitator 302, thereby avoiding having to take the process offline or divert the gas flow while sorbent 314 is being added or removed.

It should also be appreciated that similarly to the sorbent filter 218 of FIG. 2, the sorbent filter 304 in this embodiment may also act to remove additional particulate matter that has not been removed in the upstream particulate collection sections of the electrostatic precipitator 302. In one embodiment, approximately 10-90% of the particulate matter remaining in the gas stream after passing through the particulate collection sections of the electrostatic precipitator 302 may be removed by the sorbent filter 304. In another embodiment, approximately 10-50% of that remaining particulate matter may be removed by the sorbent filter 304. In yet another embodiment, approximately 10-20% of that remaining particulate matter may be removed by the sorbent filter 304.

Figure 4:
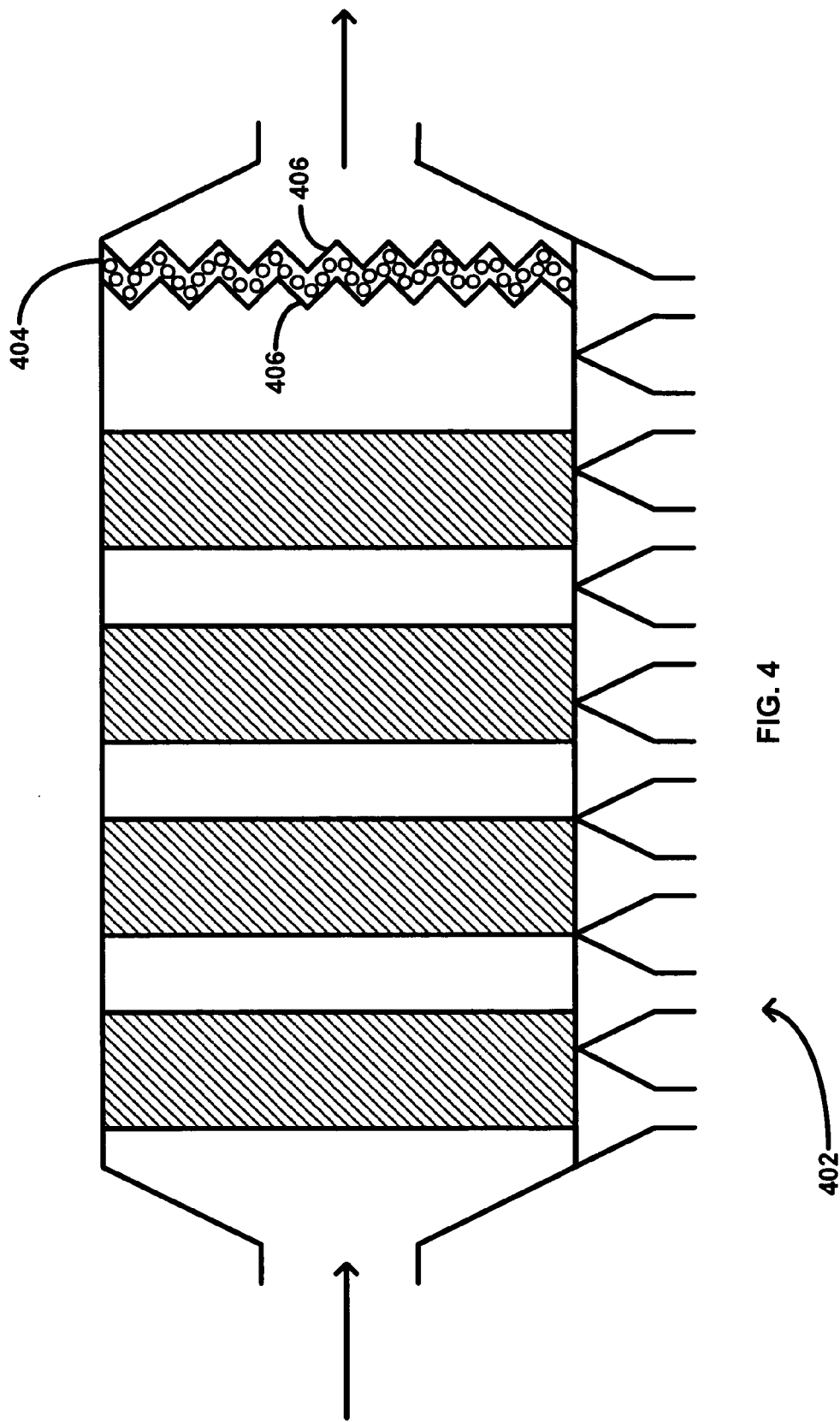
FIG. 4 is a cut-away view of an electrostatic precipitator illustrating another exemplary embodiment of the present invention.

FIG. 4 is a cut-away view of an electrostatic precipitator illustrating another exemplary embodiment of the present invention. In this embodiment, the electrostatic precipitator 402 is substantially similar to the electrostatic precipitator 202 shown in FIG. 2. In this embodiment, however, the sorbent filter 404 is configured to have pleated side walls 406 or porous surfaces, which increase the surface area of the upstream side wall 406 of the sorbent filter 404 that the gas contacts.

It should be appreciated that other contours for the porous surfaces may be used. It should also be appreciated that the upstream side wall 406 and the downstream side wall 406 of the sorbent filter 404 do not necessarily have to have the same contoured surface. In other words, the upstream side wall 406 or porous surface may be a pleated surface, and the downstream side wall or porous surface may be substantially flat, or visa versa. It should also be appreciated that the material used for the sorbent filter side walls 406 and the sorbent material itself can be the same as that described in connection with FIG. 2 or different. In addition, the sorbent discharge and addition system described in connection with FIG. 3 may also be used in connection with a sorbent filter having side walls or porous surfaces with different contours.

It should also be appreciated that similarly to the sorbent filter 218 of FIG. 2, the sorbent filter 404 in this embodiment may also act to remove additional particulate matter that has not been removed in the upstream particulate collection sections of the electrostatic precipitator 402. In one embodiment, approximately 10-90% of the particulate matter remaining in the gas stream after passing through the particulate collection sections of the electrostatic precipitator 402 may be removed by the sorbent filter 404. In another embodiment, approximately 10-50% of that remaining particulate matter may be removed by the sorbent filter 404. In yet another embodiment, approximately 10-20% of that remaining particulate matter may be removed by the sorbent filter 404.

Figure 5:
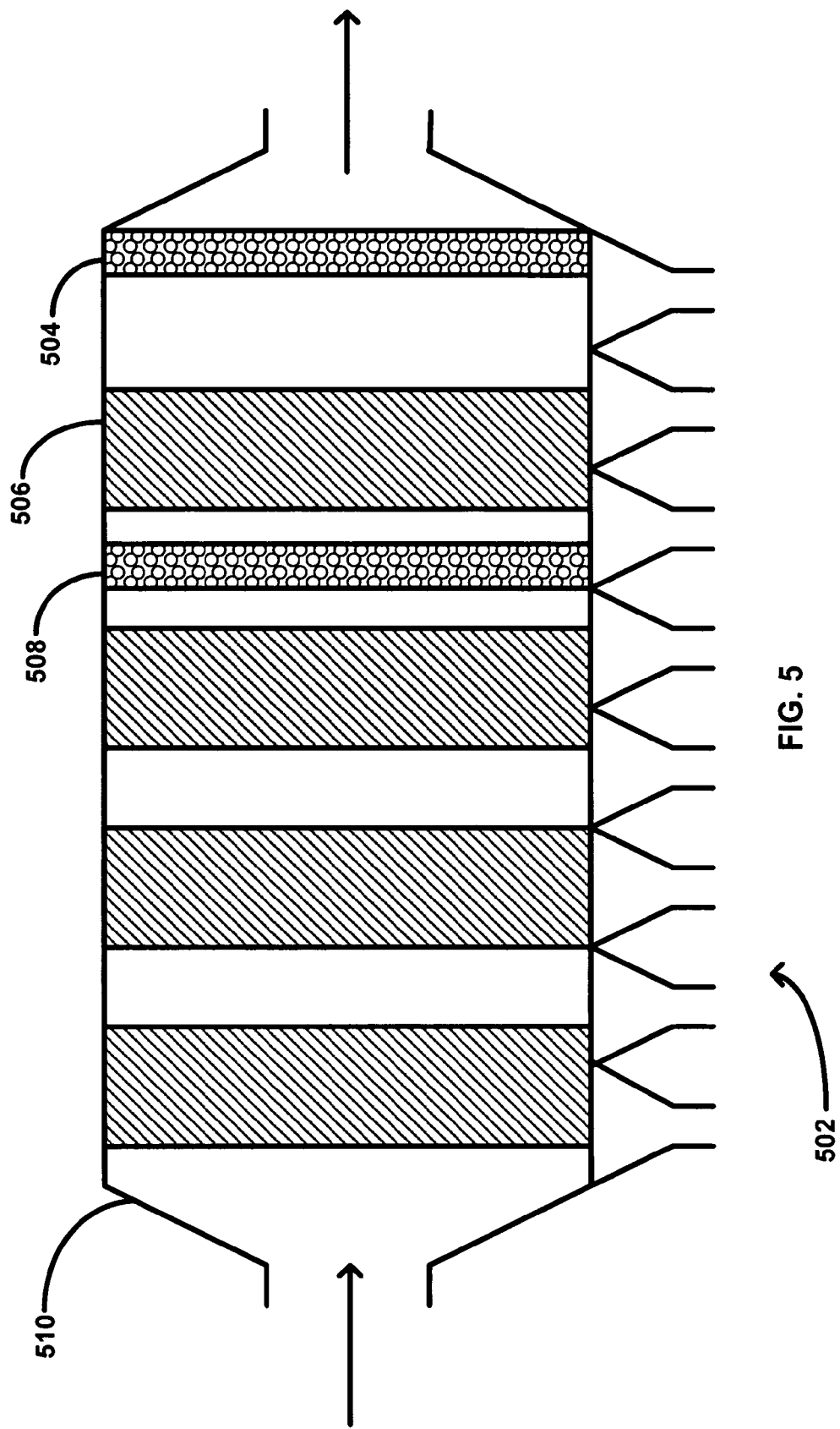
FIG. 5 is a cut-away view of an electrostatic precipitator illustrating another exemplary embodiment of the present invention.

FIG. 5 is a cut-away view of an electrostatic precipitator illustrating another exemplary embodiment of the present invention. In this embodiment, the electrostatic precipitator 502 is substantially similar to the electrostatic precipitator 202 shown in FIG. 2. In this embodiment, however, in addition to a sorbent filter 504 positioned downstream of the last particulate collection section or collection plate 506, an additional sorbent filter 508 is utilized. This second sorbent filter 508 may be positioned anywhere within the housing 510 of the electrostatic precipitator 502, including upstream and adjacent to the first sorbent filter 504. The location of the second sorbent filter 508 can be determined based upon the contaminant desired to be removed and the particulate collection efficiency of the various particulate collection sections. For example, to minimize the amount of particulate loading that this second sorbent filter 508 receives, it may be advantageous to place it as shown in FIG. 5, versus further upstream. Alternatively, in situations where the particulate removal by the upstream particulate collection sections is particularly good, this second sorbent filter may be placed further upstream. It should also be appreciated that even the first sorbent filter 504 may be located further upstream and between some of the particulate collection sections or collection plates.

The second sorbent filter 508 may be the same as the first sorbent filter 504 in size, materials of construction, the side wall or porous surface materials and their respective shapes (e.g., substantially flat, pleated, or a combination), and the actual sorbent used. Alternatively, the second sorbent filter 508 may be completely different from the first sorbent filter 504. The second sorbent filter 508, compared to the first sorbent filter 504, may be thinner to minimize the increase in pressure drop due to its use. The second sorbent filter 508 may utilize a different sorbent composition to remove a different contaminant from the gas stream compared to the first sorbent filter 504. The materials used for the sorbent filter porous surfaces may be different as may their respective shapes (e.g., substantially flat, pleated, or a combination).

It should be appreciated that the material used for the sorbent filter side walls or porous surfaces and for the sorbent material itself, for either sorbent filter, can be the same as that described in connection with FIG. 2 or different. In addition, the sorbent discharge and addition system described in connection with FIG. 3 may also be used in connection with either sorbent filter or with both sorbent filters.

It should also be appreciated that similarly to the sorbent filter 218 of FIG. 2, the first and second sorbent filters 504, 508 in this embodiment may also each act to remove additional particulate matter that has not been removed in the upstream particulate collection sections of the electrostatic precipitator 502. In one embodiment, approximately 10-90% of the particulate matter remaining in the gas stream after passing through the particulate collection sections of the electrostatic precipitator 502 upstream of a given sorbent filter may be removed by each of the sorbent filters 504, 508. In another embodiment, approximately 10-50% of that remaining particulate matter may be removed by each of the sorbent filters 504, 508. In yet another embodiment, approximately 10-20% of that remaining particulate matter may be removed by each of the sorbent filters 504, 508.

Figure 6:
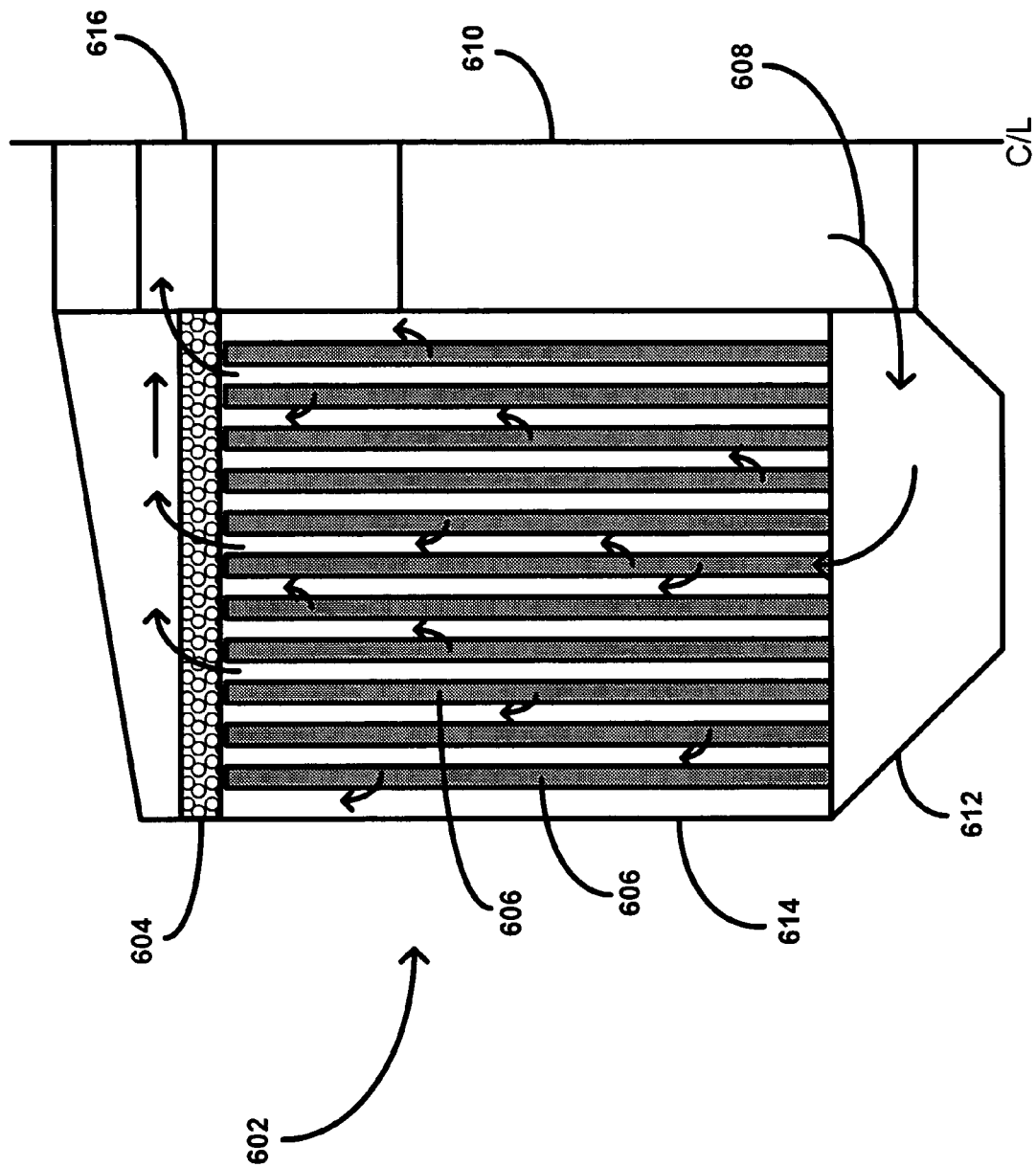
FIG. 6 is a cut-away view of a baghouse illustrating another exemplary embodiment of the present invention.

FIG. 6 is a cut-away view of a baghouse illustrating another exemplary embodiment of the present invention. In this embodiment, a baghouse 602, which may also be a reverse-gas baghouse, is utilized to house a sorbent filter 604. In this particular embodiment, the baghouse comprises a plurality of filter bags 606, which may be referred to as particulate collection sections, and the sorbent filter 604 is positioned above these filter bags 606.

In operation, the gas 608, as shown by the arrows, enters the baghouse 602 in the inlet duct 610 and passes to the ash hopper 612 and into the center of the filter bags 606. The gas passes from the center of the filter bags 606 into the chamber 614 surrounding the filter bags 606. The gas then passes through the sorbent filter 604, which allows for adsorption of a vapor phase contaminant or contaminants onto the sorbent material and removal from the bulk gas. The gas then passes into the outlet plenum 616.

It should be appreciated that the sorbent filter 604 may also remove additional particulate matter not collected by the filter bags 606. In one embodiment, approximately 10-90% of the particulate matter remaining in the gas stream after passing through the particulate collection sections or filter bags 606 of the baghouse 602 may be removed by the sorbent filter 604. In another embodiment, approximately 10-50% of that remaining particulate matter may be removed by the sorbent filter

604. In yet another embodiment, approximately 10-20% of that remaining particulate matter may be removed by the sorbent filter 604.

It should be appreciated that the material used for the sorbent filter side walls or porous surfaces and for the sorbent material itself, for either sorbent filter can be the same as that described in connection with FIG. 2 or different. In addition, the sorbent discharge and addition system described in connection with FIG. 3 may also be used in connection with either sorbent filter.

Figure 7:
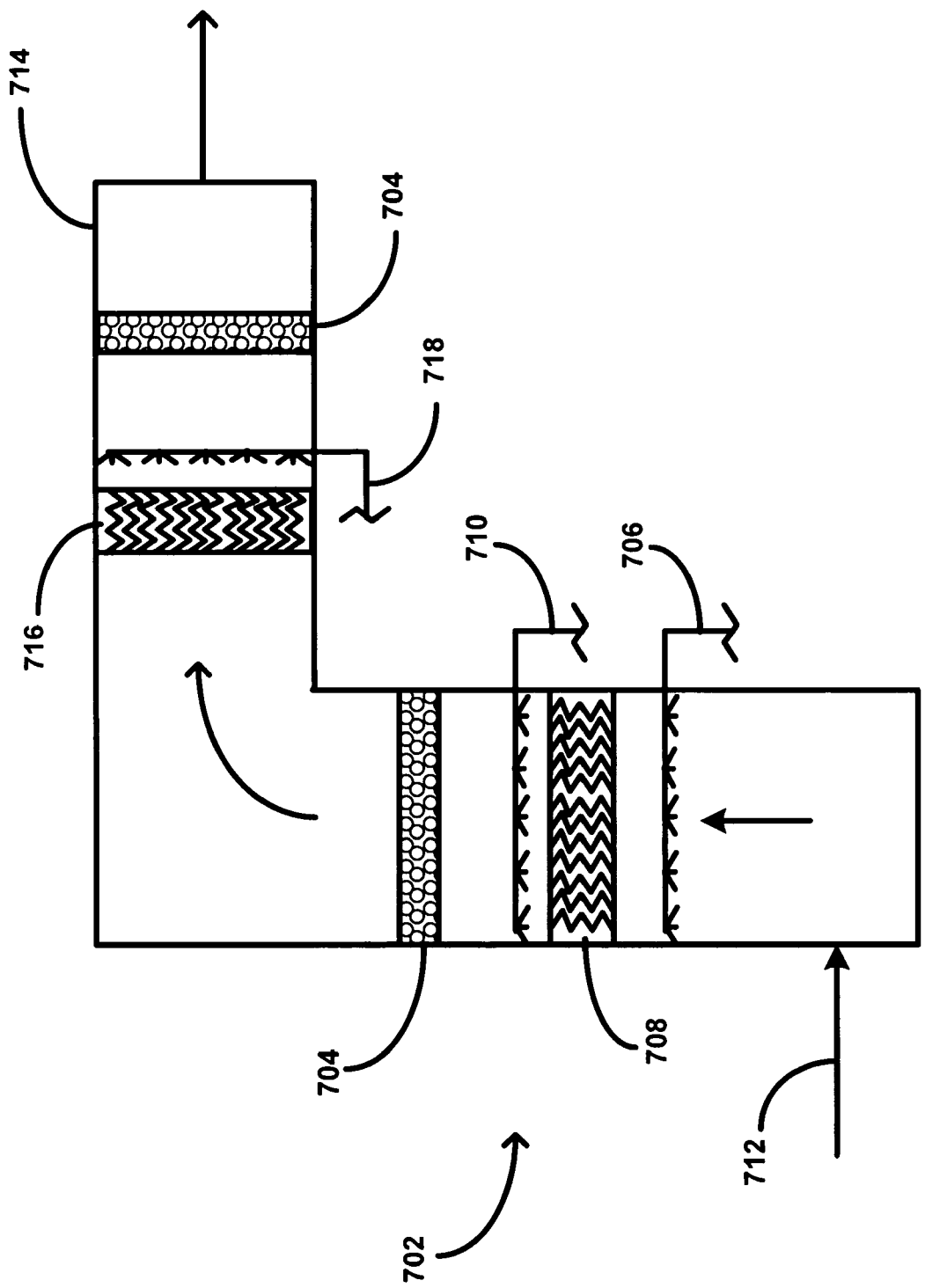
FIG. 7 is a cut-away view of a scrubber illustrating another exemplary embodiment of the present invention.

FIG. 7 is a cut-away view of a scrubber illustrating another exemplary embodiment of the present invention. In this embodiment, a counter-current wet scrubber 702 is used to house a sorbent filter 704. The scrubber 702 comprises a bank of spray nozzles 706 and a vertical mist eliminator section 708. The sorbent filter 704 is located downstream or above the vertical mist eliminator section 708 with its respective bank of wash nozzles 710.

In operation, gas 712, as shown by the arrows, enters the bottom of the scrubber 702 and travels up through the scrubber and contacting the scrubbing solution dispensed by the spray nozzles 706. The gas 712 passing through a mist eliminator 708 and then through the sorbent filter 704 where the contaminant of interest is adsorbed by the sorbent material within the sorbent filter 704. The gas then exits the scrubber 702 through an outlet duct 714. Optionally, the outlet duct 714 may contain a horizontal mist eliminator section 716 and a corresponding bank of wash nozzles 718.

It should be appreciated that the sorbent filter 704 may also remove additional particulate matter not collected by either an primary particulate collection device (not shown) located upstream of the scrubber 702 or by the contact with between the gas and the scrubbing solution from the spray nozzles 706. In one embodiment, approximately 10-90% of the particulate matter remaining in the gas stream after passing through either a primary particulate collection device or the spray nozzles 706 may be removed by the sorbent filter 704. In another embodiment, approximately 10-50% of that remaining particulate matter may be removed by the sorbent filter 704. In yet another embodiment, approximately 10-20% of that remaining particulate matter may be removed by the sorbent filter 704.

Also, optionally, the sorbent filter 704 may be placed in the outlet duct 714. In the case where a horizontal mist eliminator section 716 is used, the sorbent filter 704 may be placed downstream of the horizontal mist eliminator section 716 and its corresponding bank of wash nozzles 718. Alternatively, the sorbent filter 704 located in the outlet duct 714 could be used in addition to a sorbent filter 704 located within the scrubber 702.

It should be appreciated that the material used for the sorbent filter side walls or porous surfaces and for the sorbent material itself, for either sorbent filter, can be the same as that described in connection with FIG. 2 or different. In addition, the sorbent discharge and addition system described in connection with FIG. 3 may also be used in connection with either sorbent filter.

It should also be appreciated that similarly to the sorbent filter 218 of FIG. 2, the sorbent filter 704, or both sorbent filters 704 if two are used, in this embodiment may also remove additional particulate matter that has not been removed by an upstream primary particulate collection device or by the scrubber 702 itself. In one embodiment, approximately 10-90% of the particulate matter remaining in the gas stream after passing through the particulate collection sections of primary particulate collection device and the spray nozzles 706 upstream of a given sorbent filter may be removed by the sorbent filter 704, or by both sorbent filters 704 if two are used. In another embodiment, approximately 10-50% of that remaining particulate matter may be removed by the sorbent filter 704, or by both sorbent filters 704 if two are used. In yet another embodiment, approximately 10-20% of that remaining particulate matter may be removed by the sorbent filter 704, or by both sorbent filters 704 if two are used.

Various embodiments of the invention have been described above. The descriptions are intended to be illustrative of various embodiments of the present invention and are not intended to be limiting. It will be apparent to one of skill in the art that modifications may be made to the invention as described without departing from the scope of the claims set out below. For example, it is to be understood that although the invention has been described using mercury as an exemplary contaminant, any contaminant including other trace metal contaminants may be removed by the present invention and that more than one such contaminant may be removed in some embodiments of the present invention. It should also be appreciated that the present invention is adaptable to existing particulate collecting devices and their respective housings. Furthermore, it is to be understood that although the invention has been described in some embodiments in connection with flue gas streams from coal-fired combustion processes, is contemplated that the invention may be used in connection with any gas stream containing a contaminant.

What is claimed is:

1. A method for removing a vapor phase contaminant and particulate from a gas stream produced by a combustion device, comprising:
   passing a gas stream produced by a combustion device and comprising a vapor phase contaminant and particulate through a primary particulate collection device comprising a housing and at least one particulate collection section;
   removing at least a portion of said particulate from said gas stream using said at least one particulate collection section;
   passing said gas stream through a sorbent filter after said removing of said portion of said particulate, said sorbent filter comprising a pair of porous surfaces and a bed of sorbent particles disposed between, and contained by, said porous surfaces and positioned within said housing of said primary particulate collection device downstream of and physically separate from said at least one particulate collection section, wherein said sorbent particles comprise a plurality of granular or pelletized sorbent particles;
   removing at least a portion of said vapor phase contaminant from said gas stream using said sorbent filter;
   removing at least a portion of said sorbent particles from said sorbent bed to a container disposed outside of said housing of said primary particulate collection device concurrently with said passing said gas stream through said sorbent filter; and
   adding additional sorbent particles to said sorbent bed.

2. The method of claim 1, wherein said plurality of granular or pelletized sorbent particles are approximately 1 mm to approximately 5 cm in diameter and said pair of porous surfaces comprises a pair of screens.

3. The method of claim 1, wherein said sorbent particles each comprise a sorbent coating.

4. The method of claim 3, wherein said plurality of granular or pelletized sorbent particles are approximately 1 mm to approximately 5 cm in diameter and said pair of porous surfaces comprises a pair of screens.

5. The method of claim 1, further comprising removing at least another portion of said particulate using said sorbent filter.

6. The method of claim 5, wherein said removing of said at least another portion of said particulate comprises removing between approximately 10% and approximately 90% of said particulate in said gas stream downstream of said primary particulate collection device using said sorbent filter.

7. The method of claim 6, wherein said removing of said at least another portion of said particulate comprises removing between approximately 10% and approximately 50% of said particulate in said gas stream downstream of said primary particulate collection device using said sorbent filter.

8. The method of claim 7, wherein said removing of said at least another portion of said particulate comprises removing between approximately 10% and approximately 20% of said particulate in said gas stream downstream of said primary particulate collection device using said sorbent filter.

9. The method of claim 1, wherein said primary particulate collection device comprises a plurality of particulate collection sections and said sorbent filter comprises a first sorbent filter positioned downstream of all of said particulate collection sections, and further comprising:
passing said gas stream through a second sorbent filter, said second sorbent filter positioned within said housing of said primary particulate collection device upstream of at least one of said particulate collection sections and downstream of at least a second one of said particulate collection sections; and
removing at least another portion of said vapor phase contaminant from said gas stream using said second sorbent filter.

10. The method of claim 9, further comprising removing at least another portion of said particulate using said first sorbent filter.

11. The method of claim 10, wherein said removing of said at least another portion of said particulate comprises removing between approximately 10% and approximately 90% of said particulate in said gas stream downstream of all of said particulate collection sections using said first sorbent filter.

12. The method of claim 10, further comprising removing at least another portion of said particulate using said second sorbent filter.

13. The method of claim 9, wherein said first sorbent filter comprises a first bed of sorbent particles having a first sorbent composition and said second sorbent filter comprises a second bed of sorbent particles having said first sorbent composition.

14. The method of claim 1, wherein said gas stream comprises a coal-fired boiler flue gas.

15. The method of claim 1, wherein said vapor phase contaminant comprises mercury and said sorbent particles comprise activated carbon, and wherein said removing of said portion of said vapor phase contaminant comprises adsorbing said mercury onto said activated carbon.

16. The method of claim 1, wherein said primary particulate collection device comprises an electrostatic precipitator.

17. The method of claim 16, wherein said gas stream comprises a coal-fired boiler flue gas, said vapor phase contaminant comprises mercury, and said sorbent particles comprise activated carbon, and wherein said removing of said portion of said vapor phase contaminant comprises adsorbing said mercury onto said activated carbon.

18. The method of claim 16, further comprising removing at least another portion of said particulate using said sorbent filter.

19. The method of claim 18, wherein said removing of said at least another portion of said particulate comprises removing between approximately 10% and approximately 90% of said particulate in said gas stream downstream of said at least one particulate collection section using said sorbent filter.

20. The method of claim 19, wherein said removing of said at least another portion of said particulate comprises removing between approximately 10% and approximately 50% of said particulate in said gas stream downstream of said at least one particulate collection section using said sorbent filter.

21. The method of claim 20, wherein said removing of said at least another portion of said particulate comprises removing between approximately 10% and approximately 20% of said particulate in said gas stream downstream of said at least one particulate collection section using said sorbent filter.

22. The method of claim 16, wherein said electrostatic precipitator comprises a plurality of particulate collection sections and said sorbent filter comprises a first sorbent filter positioned downstream of all of said particulate collection sections, and further comprising:
passing said gas stream through a second sorbent filter positioned within said housing of said electrostatic precipitator upstream of at least one of said particulate collection sections and downstream of at least a second one of said particulate collection sections; and
removing at least another portion of said vapor phase contaminant from said gas stream using said second sorbent filter.

23. The method of claim 22, further comprising removing at least another portion of said particulate using said first sorbent filter.

24. The method of claim 23, wherein said removing of said at least another portion of said particulate comprises removing between approximately 10% and approximately 90% of said particulate in said gas stream downstream of all of said particulate collection sections using said first sorbent filter.

25. The method of claim 23, further comprising removing at least another portion of said particulate using said second sorbent filter.

26. The method of claim 22, wherein said first sorbent filter comprises a first bed of sorbent particles having a first sorbent composition and said second sorbent filter comprises a second bed of sorbent particles having said first sorbent composition.

27. The method of claim 22, wherein said second sorbent filter is positioned between two of said particulate collections sections that are located the furthest downstream.

28. The method of claim 1, wherein said primary particulate collection device comprises a baghouse.

29. The method of claim 1, wherein said primary particulate collection device comprises a scrubber.

30. The method of claim 1, wherein said removing of said at least a portion of said sorbent particles, comprises removing said at least a portion of said sorbent particles from said sorbent filter at a first predetermined periodic interval, and wherein said adding of said additional sorbent particles comprises adding said additional sorbent particles to said sorbent bed at said predetermined periodic interval.

31. The method of claim 30, further comprising determining said predetermined periodic interval based upon a measured removal of said vapor phase contaminant.

32. The method of claim 1, wherein said removing of said at least a portion of said sorbent particles, comprises continuously removing said at least a portion of said sorbent particles from said sorbent bed, and wherein said adding of said additional sorbent particles comprises continuously adding said additional sorbent particles to said sorbent bed during said passing of said gas stream through said sorbent filter.

33. A method for removing a vapor phase contaminant and particulate from a gas stream, comprising:
passing a gas stream comprising a vapor phase contaminant and particulate through a primary particulate collection device comprising a housing and at least one particulate collection section;
removing at least a portion of said particulate from said gas stream using said at least one particulate collection section;
passing said gas stream through a sorbent filter comprising a pair of porous surfaces and a bed of sorbent particles disposed between, and contained by, said porous surfaces after said removing of said portion of said particulate, wherein said sorbent particles comprise a plurality of granular or pelletized sorbent particles; and
removing at least a portion of said vapor phase contaminant from said gas stream using said sorbent filter;
removing at least a portion of said sorbent particles from said sorbent bed concurrently with said passing said gas stream through said sorbent filter; and
adding additional sorbent particles to said sorbent bed.

34. The method of claim 33, wherein said sorbent filter is positioned downstream of said primary particulate collection device.

35. The method of claim 33, wherein said plurality of granular or pelletized sorbent particles are approximately 1 mm to approximately 5 cm in diameter and said pair of porous surfaces comprises a pair of screens.

36. The method of claim 33, wherein said plurality of granular or pelletized sorbent particles each comprise a sorbent coating.

37. The method of claim 36, wherein said plurality of granular or pelletized sorbent particles are approximately 1 mm to approximately 5 cm in diameter and said pair of porous surfaces comprises a pair of screens.

38. The method of claim 33, further comprising removing at least another portion of said particulate using said sorbent filter.

39. The method of claim 38, wherein said removing of said at least another portion of said particulate comprises removing between approximately 10% and approximately 90% of said particulate in said gas stream downstream of said primary particulate collection device using said sorbent filter.

40. The method of claim 39, wherein said removing of said at least another portion of said particulate comprises removing between approximately 10% and approximately 50% of said particulate in said gas stream downstream of said primary particulate collection device using said sorbent filter.

41. The method of claim 40, wherein said removing of said at least another portion of said particulate comprises removing between approximately 10% and approximately 20% of said particulate in said gas stream downstream of said primary particulate collection device using said sorbent filter.

42. The method of claim 33, wherein said removing of said at least a portion of said sorbent particles, comprises removing said at least a portion of said sorbent particles from said sorbent filter at a first predetermined periodic interval, and wherein said adding of said additional sorbent particles comprises adding said additional sorbent particles to said sorbent bed at said predetermined periodic interval.

43. The method of claim 42, further comprising determining said predetermined periodic interval based upon a measured removal of said vapor phase contaminant.

44. The method of claim 33, wherein said removing of said at least a portion of said sorbent particles, comprises continuously removing said at least a portion of said sorbent particles from said sorbent bed, and wherein said adding of said additional sorbent particles comprises continuously adding said additional sorbent particles to said sorbent bed during said passing of said gas stream through said sorbent filter.

* * * * *